United States Patent [19]

Sato et al.

[11] 4,305,125

[45] Dec. 8, 1981

[54] INFORMATION PROCESSING SYSTEM WITH AN OPERATION CONSOLE FOR PROCESSING BOTH NORMAL OPERATION AND MAINTENANCE COMMANDS

[75] Inventors: Fumitaka Sato, Oume; Masahiko Iwane, Tokyo; Masaki Murayama, Fussa, all of Japan

[73] Assignee: Tokyo Shibaura Electric Co., Ltd., Japan

[21] Appl. No.: 54,963

[22] Filed: Jul. 3, 1979

Related U.S. Application Data

[62] Division of Ser. No. 886,598, Mar. 14, 1978.

[30] Foreign Application Priority Data

| Mar. 14, 1977 | [JP] | Japan | 52-27788 |
| Mar. 15, 1977 | [JP] | Japan | 52-28428 |
| Mar. 15, 1977 | [JP] | Japan | 52-28429 |

[51] Int. Cl.³ ............................................. G06F 11/00
[52] U.S. Cl. ................................................ 364/200
[58] Field of Search ... 364/200 MS File, 900 MS File; 371/16, 20

[56] References Cited

U.S. PATENT DOCUMENTS

| 3,564,509 | 2/1971 | Perkins et al. | 364/200 |
| 3,786,430 | 1/1974 | Hajdu et al. | 364/200 |
| 3,964,088 | 6/1976 | Ducrocq et al. | 364/200 |
| 4,001,789 | 1/1977 | Sweet | 364/200 |

Primary Examiner—Raulfe B. Zache
Attorney, Agent, or Firm—Finnegan, Henderson, Farabow, Garrett and Dunner

[57] ABSTRACT

An information processing system includes an information processing unit and an operation console. The information processing unit includes a CPU having a fault diagnostic unit which is coupled with the diagnostic interface port of the operation console, through a diagnostic interface. The operation console is provided with a microprocessor having a first operation mode carrying out at least a normal operation processing function and a second mode executing both a maintenance command processing function and a normal operation processing function, and with a memory for storing a maintenance command processing routine for executing the maintenance command processing function. When an operator issues an instruction for shifting the first operation mode to the second operation mode control is transferred to the operation console so that the microprocessor executes the maintenance command processing function and the normal operation processing function.

11 Claims, 11 Drawing Figures

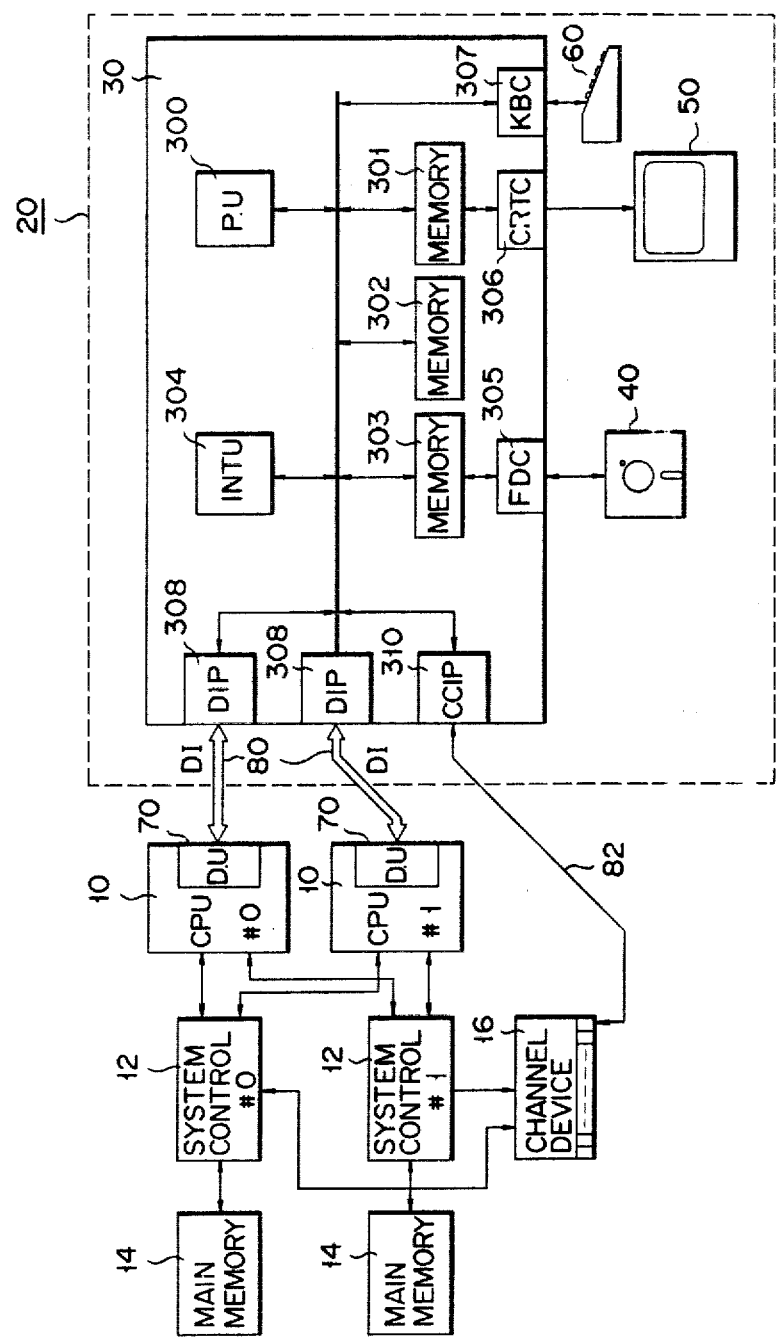
F I G. 1

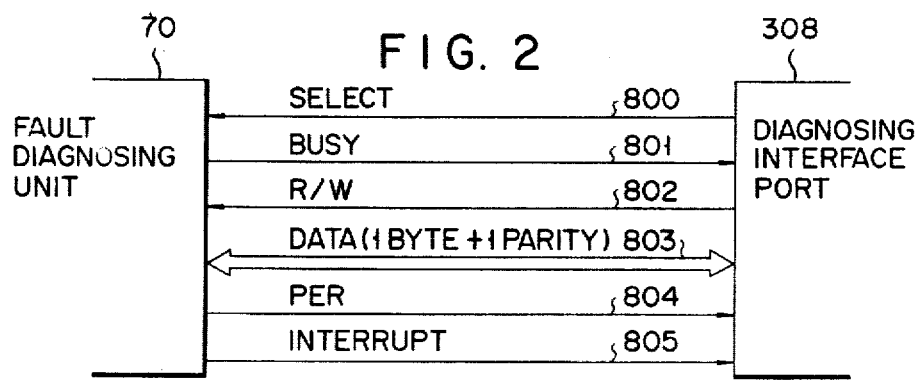
FIG. 2
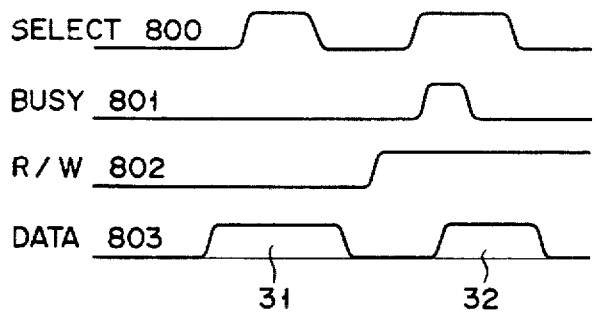
FIG. 3
FIG. 4
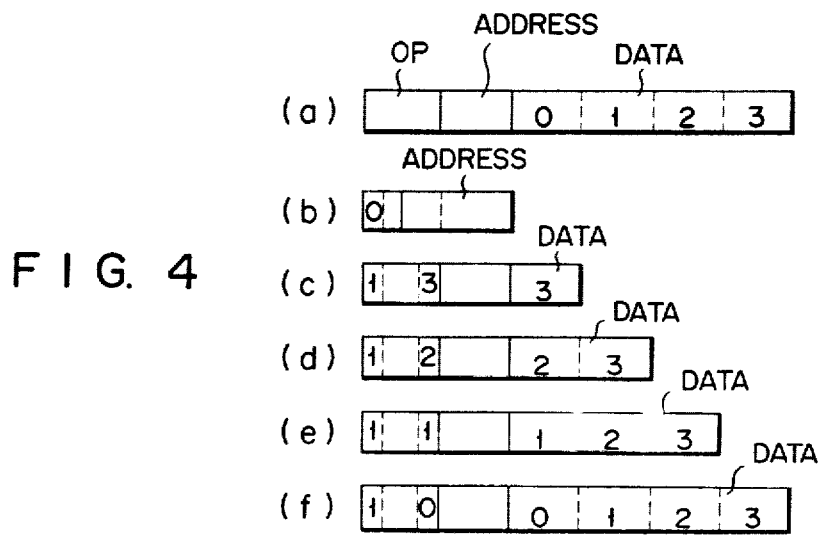

① *MEDIA--S#01234-05 MNT 0-12-03#0246ABCMASTER
② *CPU INTERRUPT #1 *
③ * R-EME
④ * MULTI CPU ? Y
⑤ * RETRY ? Y
⑥ *AUTO RECONF CPU 1 RELEASED
⑦ *PLEASE FIX CPU 1 ⟵ "MAINT" KEY
⑧ *OUT OF PAPER PR 012
⑨ * FDD VOL. MAINT-A3
⑩ (MAINT)* r/r/ra
⑪           RA = 0135724601 23
⑫ *MEDIA--S#01234-05 DMT 0-12-03#0246ABCMASTER
⑬ (MAINT)* diag
⑭     DIAG-START. LOAD FDD "DIAG-1"

FIG. 9

INFORMATION PROCESSING SYSTEM WITH AN OPERATION CONSOLE FOR PROCESSING BOTH NORMAL OPERATION AND MAINTENANCE COMMANDS

This is a division of application Ser. No. 886,598 filed Mar. 14, 1978.

BACKGROUND OF THE INVENTION

The present invention relates to an information processing system having an operation console operated by an operation processor, and more particularly to an information processing system provided with a fault diagnostic unit using a novel operation processor including a microprocessor and an information processing unit including an improved hardware system which is suitable for performing fault diagnosis.

By convention, an operation console has been used mainly for communication between an operating system and an operator. In general, the hardware of the console has been designed aiming at provision of smooth and effective communication between the operating system and the operator. Many attempts have been made to reduce the cost of the total system. One of them is to properly share the work between the operating system and the operator in accordance with the character of the work. Another is to assign the functions of fault diagnosis of the system, the loading of firmware, and the like. The result of this is a versatile application of the operation console.

However, when the hardware of the CPU malfunctions, proper operation of the operating system per se is impossible and the operation console merely displays its fault condition. Accordingly, all the processing must be done by an operator. For this, a manual for operators is prepared describing how to judge the abnormal states and how to cope with them for various possible cases of faults. Accordingly, the operators must be skilled in the manual. Further, a maintenance panel is used for displaying the inner state of the faulty CPU.

Therefore, disadvantages of the conventional operation console are as follows: '(1) Since fault conditions rarely occur, it is very difficult for the operators to master the manual contents. If they know it only roughly, they are insufficient for smoothly dealing with abnormal conditions.

(2) The hardware for indicating the internal status of the CPU is expensive. Particularly, the data path for the fault indication may be cheaply manufactured; however, the assembling and wiring cost of the panel is expensive.

(3) The maintenance panel is assembled from a large number of switches and lamps. This results in poor operation.

The information processing unit generally has a main memory unit storing a number of instructions and successively executes the instructions for effecting its purpose. The unit additionally includes various kinds of hardware for fault diagnosis, maintenance work, firmware loading, fault detection, and the like. In the following specification, these hardware systems will be referred collectively to as maintenance/diagnostic hardware. An effort has been made to make maximum use of common hardware items. However, the use, object, and control master (operators, maintenance engineers, diagnostic programs) are different so that such an effort has been unsuccessful. Therefore, the number of hardware items in use is large and they are generally complex and difficult to understand.

SUMMARY OF THE INVENTION

Accordingly, an object of the present invention is to provide an information processing system with an operation console in which the above-mentioned disadvantages are eliminated, the processing ability of the console is improved by using a microprocessor for controlling the operation console, and the console additionally has a maintenance panel function, with improved operation.

Another object of the present invention is to provide an operation console for smoothly and rapidly dealing with abnormal conditions and wherein a microproccessor is used for detecting and signaling the abnormal condition such as a fault in the CPU, which is difficult in dealing by an operating system and for execution of a standard processing procedure.

Still another object of the invention is to provide an information processing system in which procedures for fault diagnosis, firmware loading, maintenance operation, and fault detection in system operation are grouped into diagnostic commands and the system cost is reduced and operation simplified.

Yet another object of the invention is to provide an information processing system with an operation console in which when one of a plurality of information processing units malfunctions, the given JOB is executed by the remaining processing units and at the same time diagnosis and maintenance of the faulty CPU may be performed.

A further object of the present invention is to provide a method for making a maintenance/diagnostic hardware apparatus, which is versatile in use and economical and applicable for all the objects. More specifically, this is achieved by systematizing the maintenance/diagnostic hardware to perform diagnostic commands according to a common principle.

Another object of the invention is to provide an economical means with good operation in which the inner state of the information processing unit may be freely read out and modified by an operator.

BRIEF DESCRIPTION OF THE DRAWINGS

Other objects and features of the invention will be apparent from the following description taken in connection with the accompanying drawings, in which:

FIG. 1 is a block diagram of an embodiment of an information processing system according to the invention;

FIG. 2 illustrates the details of a DI interface;

FIG. 3 is a set of timing diagrams for illustrating data transfer in the DI interface;

FIG. 4 illustrates formats of diagnostic commands;

FIG. 9 illustrates one form of display provided on a CRT display screen in accordance with the invention;

DETAILED DESCRIPTION OF THE PREFERRED EMBODIMENTS

Figure 5:
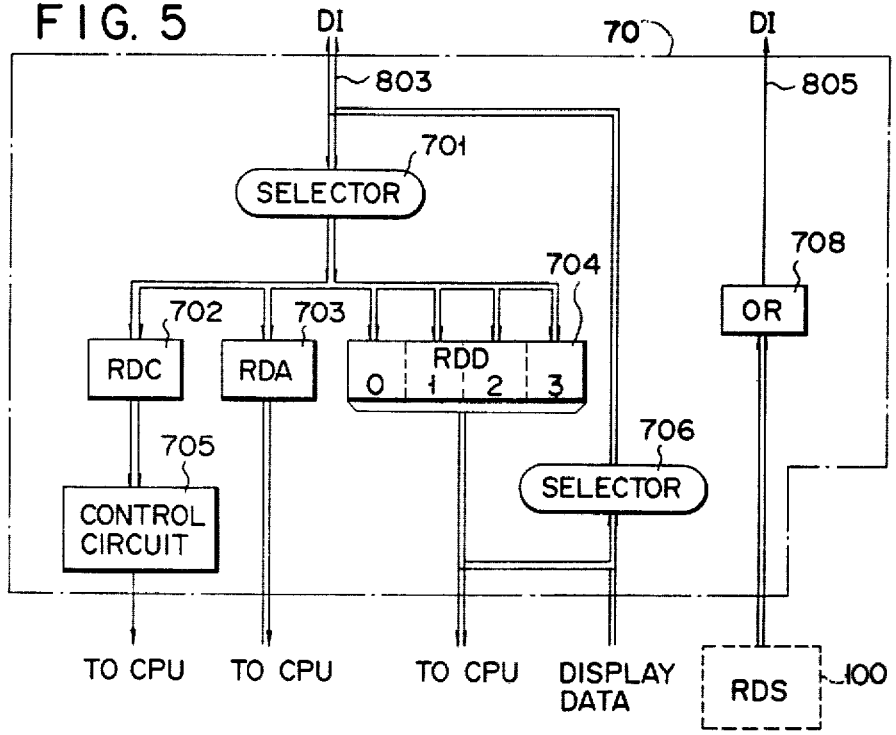
FIG. 5 is a block diagram of a diagnostic unit.

The data processing system of the invention will be described with reference to the drawings. One part of the specification will discuss a fault diagnostic system using an operation processor including a microprocessor therein and a subsequent part will discuss a data processor improved for fault diagnosis. It will be understood, however, that the operation processor and the data processing system operate cooperatively.

Referring now to the drawings, and particularly to FIG. 1, there is shown a block diagram of an entire data processing system according to the present invention. In the figure, reference numeral 10 designates a central processing unit (CPU), numeral 12 a system controller, and 14 a main memory. As shown, this system uses a couple of CPUs and their associated system components. This type system is well known and thus no further elaboration of the system will be given here. The CPUs are connected to an operation console 20 essential to the present invention so that it may communicate with an operator.

The operation console 20 is comprised of an operation processor 30, a flexible disk storage unit 40, a CRT display device 50, and a keyboard 60. The processor 30 comprises a microprocessor 300, memories 301 to 303, and interruption unit 304, a flexible disk controller (FDC) 305, a CRT controller (CRTC) 306, a keyboard controller (KBC) 307, diagnostic interface ports (DIP) 308, and an I/O console interface port (CCIP) 310. The microprocessor 300, the memories 301 to 303 and the interruption unit INTU 304 are commercially available as microcomputers. Accordingly, the details of them will be omitted. The details of the microcomputers are described in "Integrated Circuit Technical Material TLCS-12A" issued by the assignee of the present applicant, for example. Similary, the FDC 305 is also sold as a flexible disk controller and standard peripheral circuits are described in the integrated circuit technical material, for example, "T3444A(FDC)". Accordingly, the description of it will also be omitted. The FDC 305 is connected to the memory 303 by means of the so-called direct memory access method. The CRTC 306 transfers an image of the CRT picture stored in a specific region of the memory 301 to the CRT display device 50 by means of the direct memory access method (DMA). The DIPs 308, CCIP 310, and KBC 307 are all connected as I/O devices and operate under the control of an I/O control unit, i.e. a device control unit (DCU) in the microprocessor 300 family. For simplicity, the DCU is not illustrated in the drawing. The embodiment shown in FIG. 1 is a data processing system including two independently operable CPUs. For this, the operation processor 30 is provided with two DIPs 308 connected to the CPUs 10, respectively. It will be understood that number of the DIPs depends on the number of CPUs. The CPU is provided with a diagnostic unit 70 in place of a conventional maintenance panel and communicates with the DIP 308 through a DI interface 80. Message transfer between the data processing system and the operation console 20 is performed through a channel device 16, a CCI interface 82, and a CCIP 310. As a matter of course, another I/O unit (not shown) is connected to the channel device. However, it is not essential to the invention and therefore is not illustrated in the drawing.

FIG. 2 illustrates the details of the interface 80 between the fault diagnostic unit 70 and the DIP 308. The DI interface 80 includes a bidirectional data transfer line 803 with 1 byte width (plus 1 parity bit). The data transfer is controlled by three data transfer control lines, SELECT 800, BUSY 801, and R/W 802. The SELECT 800 indicates the data transfer performed through DI interface 80 and the direction of the data transfer is indicated by signal on R/W line 802. For example, the transfer from the DIP 308 to the diagnostic unit 70 is expressed by a read R and the transfer from the diagnostic unit to the DIP by a write W. Although the SELECT 800 instructs initiation of the data transfer, the diagnostic unit 70 may not ready for the data transfer. In such a case, the BUSY 801 is transferred back to the DIP 308 and the system is in a wait condition. One byte data is transferred through DATA line 803 once each transfer cycle of the SELECT 800 line. When a parity error is detected in the data transferred to the diagnostic unit 70, the diagnostic unit 70 informs the operation processor 30 by a PER signal 804. When an abnormal condition occurs in the CPU 10, an INTERRUPT 805 is generated to inform the operation processor 30. As seen from the foregoing, the DI interface of the invention is of the operation processor initiative type so that it is very effective when the CPU is diagnosed by a diagnostic command from the operation processor.

FIG. 3 illustrates a set of timing diagrams for illustrating how data are transferred through the DI interface 80 using the control lines shown in FIG. 2. The state illustrated in FIG. 3 is that the DIP 308 transfers one byte to the diagnostic unit 70 and the one byte data is read out from the DIP 308. When data are transferred from the DIP 308 to the diagnostic unit 70, the R/W signal line is forced to be 0 and data are sent out via the data line 803, and then the SELECT signal line 800 is forced to be 1. After a predetermined time, the SELECT signal line 800 is placed at 0 and the data transfer is ceased. When data is read out from the diagnostic unit 70, the R/W signal line 802 is placed at 1 and then the SELECT signal line 800 is placed at 1. Thereafter, the diagnostic unit 70 acknowledges the data transfer request and sends data to the data line 803. After a fixed time, the DIP 308 reads in the data and places the SELECT signal line 800 at 0. Upon detection of this, the diagnostic unit stops its data transfer. In this manner, the DIP 308 takes the initiative in data transfer. When the diagnostic unit 70 is in a condition that it can not quickly respond to a data transfer request, the diagnostic unit 70 places the BUSY signal line 801 at 1 and forces the DIP 308 to be in a wait condition. FIG. 3 shows a state that, when data in the diagnostic unit 70 is read out, the diagnostic unit can not quickly respond to the data reading request. Before the SELECT signal is received, the BUSY signal is previously placed at 1. This is allowable in this system. The interface 80 is suitable for such a case that the operation time of the DI interface circuit in the diagnostic unit 70 is much shorter than the time required for the operation processor 30 taking the initiative in control to execute one instruction, as in this example.

FIG. 4 shows a set of diagnostic command formats used in the present invention. FIG. 4 (a) is a basic command format including an OP field of one byte, an address field of one byte, and a data field of four bytes. When the operation processor 30 controls the CPU 10, the diagnostic command is transferred byte by byte through the DI interface 80. The diagnostic command is transferred as a rule from the operation processor 30 to the diagnostic unit 70. In the case of a diagnostic command of the data read-out type, however, only the data field of the command is transferred from the diagnostic unit 70 to the operation processor 30.

The diagnostic command is variable in the number of bytes so as not to have unnecessary bytes. That is, with the variable length command, the transfer time of the diagnostic command in the DI interface 80 is shortened and the memory capacity of the memory storing the diagnostic commands is reduced. FIGS. 4(b) to 4(f) show examples of the diagnostic commands with variable numbers of bytes. In these variable length command formats, when the head bit of the OP field is 0, the format has no data field. When the head bit of the OP field is 1, the data length is designated by the value of the final two bits of the OP field (referred to as the SBP bits). Numerals at the lower parts of the byte representations in the data field are byte numbers. A basic function of the diagnostic command is to read out the contents of the register designated by the address field and to load the information fed from the data field into the register designated by the address field. The details of the diagnostic command function will be described later. In the diagnostic command for which the head bit is 0, the lower part of the command is also used for address indication, as will be referred to later.

FIG. 5 shows an example of the invention in which a diagnostic unit 70 is provided in the CPU. The diagram illustrated is a diagram of a part of a diagnostic unit necessary for the invention and the details of it will be illustrated in FIG. 10. In FIG. 5, numeral 701 designates a selector; 702 a command register of one byte; 703 an address register of one byte; 704 a data register of four bytes; 705 a control circuit; 706 a selector; 100 a status register; 708 an OR circuit. As previously stated, when the diagnostic command shown in FIG. 4 is issued from the operation processor 30 through the SELECT 800, R/W 802 and DATA line 803 to the CPU, fault diagnosis procedures in the CPU are initiated. In FIG. 5, the three control lines 800, 801 and 802 and the PER line 804 are not illustrated.

The kinds of the diagnostic commands transferred by the diagnostic command format shown in FIG. 4 are tabulated in Table 1. The OP field is specified by the upper three bits.

TABLE 1

| Upper 3 bits of Command | Contents of Command | Contents of Address field |
|---|---|---|
| 0 | CPU start | Address of control memory |
| 1 | CPU step | Address of control memory |
| 2 | CPU test | Address of RPM |
| 3 | Microinstruction read-out | Address of control memory |
| 4 | Data read-out | Address of register/bus |
| 5 | Data write-in | Address of register |
| 6 | Main memory read-out | Part of main memory address |
| 7 | Main memory write-in | Part of main memory address |

The following explains the operation of the circuit of FIG. 5. The diagnostic command shown in Table 1 in the format of FIG. 4 is transferred byte by byte to the diagnostic unit 70 of the CPU, through the data line 803 of the DI interface 80. The diagnostic unit 70 successively receives the diagnostic command transferred through the data line 803 of the DI interface and reconstructs the command by the selector 701. That is, the OP field is set in the RDC 702; the address field in the RDA 703; the data field in the RDD 704 specified by the lower two bits of the command. The system of the invention is so designed that, when the diagnostic unit 70 receives the diagnostic command shown in Table 1, it permits the operation or display of the conventional maintenance panel to be performed. The OP field set in the RDC 702 is decoded by the control circuit 705 to be identified as one of the commands shown in Table 1. The address field (for the contents of the address, see Table 1) set in the RDA 703 so controls as to transfer the data field set in the RDD 704 to a location internal to the CPU (for the details of the CPU, see FIG. 11 to be described later) where the contents of the command is processed. The control circuit 705 controls the diagnostic unit 70, too. The CPU executes the diagnostic operation shown in Table 1 on the basis of the OP field, the address field and the data field, and transfers the results to the CRT display device 50 of the operation console 20, as will subsequently be described. The diagnostic unit 70 in the CPU 10 and the improved hardware therein will be described in detail with reference to FIGS. 10 and 11.

The CPU 10 is provided with a status register 100 having status information in the CPU relating to fault diagnosis. The register 100 is also denoted as RDS, and indicated by a broken line in FIG. 5, for ease of illustration. The respective bits of the status register RDS include the diagnostic interruptions tabulated in Table 2 and carry out such interruptions for the operation processor 30.

TABLE 2

| | Interruption from Diagnostic Unit |
|---|---|
| Bit Position of RDS | Interruptions (Cause) |
| 0 | Indication of status of CPU stoppage |
| 1 | Occurrence of exceptional condition during the processing of exception |
| 2 | Errors of a plurality of bits in the control memory |
| 3 | Parity error in a memory for an operation check test program |
| 4 | CPU fault detected by an operation check test program |
| 5 | HALT instruction |

The bits of the RDS 100 shown in Table 2 will further be described. The bit 0 indicates whether the CPU is in stoppage condition or not and this is unmatured for interruption signal issuance. The bit 1 indicates the occurrence of a decisive fault. That is to say, when the CPU is going to process an exception by detecting an exceptional condition (e.g. undefined instruction code, a main memory access beyond the addressable region, parity error, etc.) in the CPU, an exceptional condition additionally occurs. The bit 2 also indicates a decisive error. In this case, the plural bit error occurs in the control memory with an error correction circuit so that the error can not be corrected. The bit 3 indicates an interruption for the operation processor when a parity error is found in the memory for storing an operation check test program and at this time the CPU continues its operation. The bit 4 indicates that the fault of the CPU is detected by an operation check test program.

The bit 5 indicates that the HALT instruction stops the CPU. The HALT instruction is very special and not related to the invention. When the bits 1 to 5 are set in the RDS 100, the CPU automatically stops.

When a fault occurs in the CPU, it sets the corresponding bit in the RDS shown in Table 2. The contents of the RDS may be read out through the diagnostic command shown in Table 1 by the operation processor 30. When any one of the bits from the 1st to 5th is set, an interruption signal is transferred to the DIP 308, through the OR circuit 708 (FIG. 5) and the INTERRUPT line 805. Receiving the interruption signal by way of the INTERRUPT line 805, the operation processor 30 executes the following interruption operation.

The CCI interface 82 used when the operating system exchanges information with an operator in a normal condition in FIG. 1 operates basically in such a manner that the operating system issues an I/O command to control the data transfer. Accordingly, the CPU controls the CCI interface, through the channel unit 16.

Figure 6:
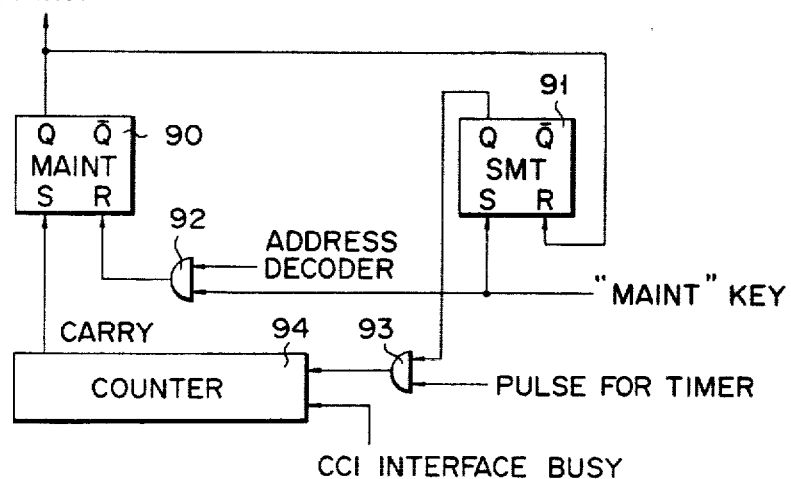
FIG. 6 is a circuit diagram of a circuit for processing an input from a "MAINT" key which is provided in an operation processor.

The explanation to follow is the hardware provided in the operation console 20 in FIG. 1 to carry out the operation corresponding to that of the conventional maintenance panel. In the present invention, a MAINT key is newly used for one of the function keys on the keyboard 60. This is satisfied by an additional provision of a key such as a function key (for example, a cursor operation key) other than alphanumeric keys used in an ordinary keyboard. The functional key input is processed as in the case of ordinary alphanumeric keys. That is, it is read out by the program of an operation processor 30 for its processing. A special circuit is not necessary for the processing of the MAINT key. In the present invention, however, hardware to process the input from "MAINT" key is used as shown in FIG. 6. In FIG. 6, reference numeral 90 designates a MAINT flop-flop; 91 an SMT flip-flop; 92 and 93 AND circuits; 94 a counter. A key input signal MAINT is applied to the set terminal of the SMT flip-flop 91 and one of the inputs of the AND circuit. The output of an address decoder is inputted to the other input of the AND circuit 92. The output of the AND circuit 92 resets the MAINT flip-flop 90. The set output Q of the SMT flip-flop 91 and a timer pulse are inputted to the AND circuit 93 of which the output drives the counter 94. The carry output of the counter 94 sets the MAINT flip-flop 90 which in turn produces a "MAINT" signal. The MAINT signal is stored as a specific 1 bit in a specific address of the memory 302 in FIG. 1, for example. The 1 bit stored is read out by a microprocessor 300. The MAINT signal resets the SMT flip-flop 91. The counter 94 is reset by the CCIP interface BUSY. The MAINT flip-flop 90 and the SMT flip-flop 91 are so constructed to be a specific bit in a specific address of the memory as viewed from the microprocessor 300. The connection of the microprocessor is detailed in the technical materials mentioned supra. The circuit is used to provide a waiting process of 1 second at maximum in order to display one line message on the CRT display device. In other words, the circuit shown in FIG. 6 provides a waiting time for one line message communication at least being currently performed, in order to carry out an interruption of a maintenance command by the MAINT key when an operating system normally operating exchanges information with an operator through the CCI interface. It will be understood that the present invention is applicable for a system including one central processing unit as well as the system using a plurality of central processing units.

Figure 7:
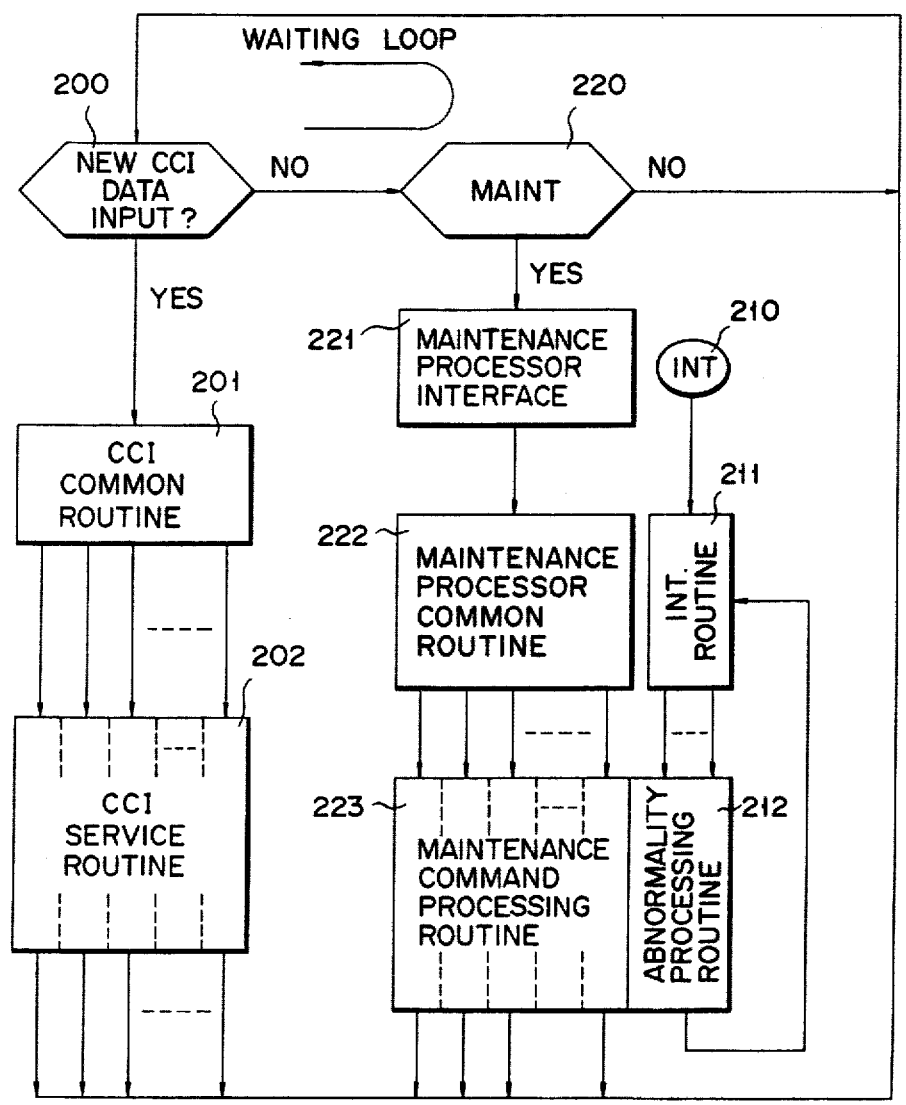
FIG. 7 shows a flow chart for illustrating the processing operation in the operation console.

The operation of the present invention with the abovementioned construction will be described with reference to flow charts. FIG. 7 shows a flow chart for illustrating the processing operation of the operation console.

(I) Operation Console Control in Normal Operation of the Operating System

A message issued by the operating system to an operator is successively transferred byte by byte from the channel device 16 to the operation processor 30, via the CCI interface 82. In normal operation, MAINT does not exist and a waiting loop is formed until a new CCI data input appears, as shown in FIG. 7 When the CCI port 310 receives a new CCI data input 200, it escapes from the loop and enters the CCI common routine 201 to write the one byte of data received into the location in the CRT display region of the memory 301 indicated by a cursor. An entire message coming through the CCI interface 82 is received in a similar manner. The data written into the CRT display region of the memory 301 is displayed on the screen of the CRT display device 50 in parallel with the data processing by the microprocessor through the so-called DMA operation. The message processing in the CCI common routine is performed on a character by character basis. In the processing, the service routine 202 corresponding to each character is carried out. When the processing of the service routine 202 is completed, the operation returns to the waiting loop and waits for a new incoming message from the CCI interface 82. The service routine 202 is divided into two sections: one section displays the message on the CRT display device 50; the other enables the processor 300 to read an answer typed in by an operator from the keyboard 60 for the message and returns through the CCI interface 82 to the channel device 16. Both the services may each be constructed by a simple routine.

(II) Operation Console Control in Fault Occurrence of an Operating System

Assume now that the error condition "plural bits error of control memory" occurs in the control memory of the CPU 10 (#1) in the data processing system of FIG. 1. As previously stated referring to FIG. 5 and Table 2, the CPU 10 (#1) at this time sets the bit 2 (Table 2) of the RDS 100 included therein and produces an interruption signal via the OR circuit 708 in FIG. 3. The interruption signal then goes through the INTERRUPT line 805 of the DI interface in FIG. 5 to the DI port 308 of the operation processor 30 shown in FIG. 1. The INTERRUPT signal received by the DI port 308 is transferred via a control line (not shown) to the INTU 304 in FIG. 1 in the form of an interrupt request. The INTU 304 also sends the interruption request to the microprocessor 300 where a desired abnormal processing routine is executed in the microprocessor. In FIG. 7 illustrating the flow chart, an interruption 210 indicates the interruption request and an abnormal interruption routine 211 controls the interruption processing routine.

The microprocessor provides several abnormal interruption routines 211 corresponding to the interruption levels. Some examples of the interruption levels in the microprocessor are shown in Table 3.

TABLE 3

| Interruption Levels and its Causes of Microprocessor | |
|---|---|
| Level | Causes |
| 1 | DI interface parity error (#0) |
| 2 | Same as above (#1) |
| 3 | End of FDD operation |
| 4 | Diagnostic unit interruption (#0) |
| 5 | Same as above (#1) |
| 6 | CPU firmware load |

Figure 8:
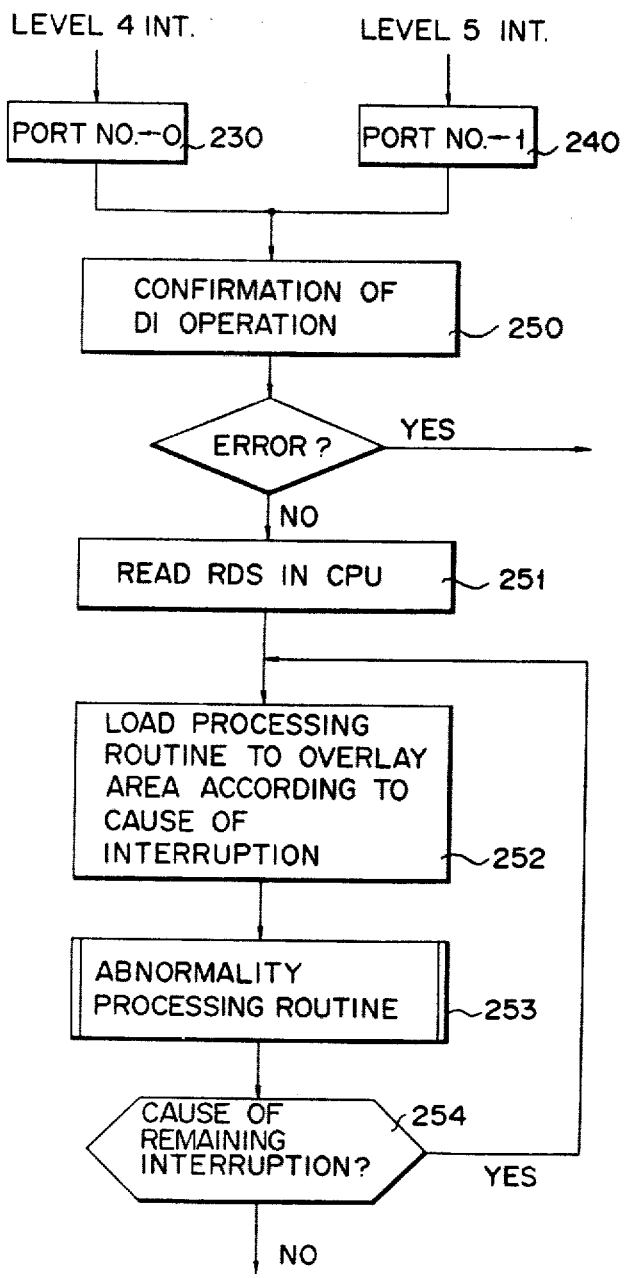
FIG. 8 shows a flow chart illustrating in detail particular interruption processing routines.

In this example, the interruption is serviced from the diagnostic unit 70 and thus the interruption level is the "Diagnostic unit interruption (#1)" of the level 5 in Table 3. Accordingly, the operation jumps to an abnormal processing routine 212 shown in FIG. 7. The details of the abnormal processing routine 212 are shown in FIG. 8.

A brief description of the abnormal processing routine shown in FIG. 3 will be given. When the diagnostic unit 70 issues an interruption, as in the example, the level 4 or 5 interruption selects the port number of the DIP at step 230 or 240 to be serviced. In this example, it is the port (#1) and therefore the program enters step 240. After it is checked that the DI interface 80 properly operates (step 250), if there is no trouble, the contents of the RDS in the CPU are read out at step 251 by using the diagnostic command (e.g. "4" data read-out in table 1). Then, in accordance with the interruption cause, the processing routine is loaded into an overlay area (step 252) and the abnormal processing routine is executed at step 253. This means that it acknowledges the occurrence of the "plural bit error of control memory" (see Table 2) due to the set of the bit 2 of the RDS in the computer and reads out the corresponding abnormal processing routine from the flexible disk 40 of the operation console to perform it. When the execution of the abnormal processing routine is completed, it is investigated as to whether there is any other interruption unprocessed or not (step 254). As a result of the investigation, if there is no interruption cause, control is returned to the original place where the interrupt occurred.

The invention has an important feature in the abnormal processing routine. The feature relates to the feature that the flexible disk device 40 and the microprocessor 300 are provided in the operation console 20 in FIG. 1. In the invention, the abnormal processing routine 212 (FIG. 7) is stored in the flexible disk unit. The reason for this is that the abnormal processing procedure is complex and long. That is to say, the routine is once stored in the memory and, when necessary, it is read out onto the overlay area for execution. The CCI routine 202 or the interruption processing routine 211 are of small scale and must have a fast response time. For this, these are normally stored in the memory 302 (FIG. 1). The flexible disk unit 40 stores not only the abnormal processing routine but also all other routines necessary for the processing procedures performed in the conventional maintenance panel such as the procedure needed for the CPU diagnostic processing.

In this manner, the function of the microprocessor and the memory capacity of the flexible disk are utilized to successfully process diagnostic functions for the CPU which have in the past been difficult to perform.

A message exchange between the operating system and the operation console, the interruption service in the fault occurrence of the operating system and the maintenance command processing of the malfunctioning CPU after execution of the abnormal processing routine will be referred to by using an example referring to FIG. 9. FIG. 9 shows one form of display on CRT unit 50 in which a message resulting from the above-mentioned operation is displayed. The manner in which a message from the ordinary operating system coexists with the former message is also illustrated. Numerals ① to ⑭ on the left side of the screen are used to facilitate the explanation and would not actually appear on the display. For the processing routine and the related hardware, see FIG. 7 and FIGS. 1, 2 and 5.

In FIG. 9, ① is a message that the operating system requires an operator to mount a magnetic tape. At this time, if the "plural bit error of control memory" takes place in the CPU 10 (#1) as shown in the above example, the above-mentioned operation causes the CPU 10 (#1) to send the interrupt request to the operation processor 30, and line ② is displayed. Upon reception of the interrupt request, the operation processor 30 executes the interruption processing routine 211 in FIG. 7 and recognizes that the cause of the interruption is the "plural bit error of control memory". This is displayed as line ③. Then, line ④ is displayed to ask the operator to check to see if the standard processing procedure for the multi-CPU system may be employed or not for the interruption, in the abnormal processing routine 212 (FIG. 7) called from the interruption processing routine 211. If the answer is YES, the operator types in y (the letter y in line ④ indicates the answer typed in by the operator). The abnormal processing procedure (stored in the flexible disk device 40 as described above) of the abnormal processing routine progresses. Then, line ⑤ is displayed to ask the operator to check whether the operation is to be restarted with a reconstructed system or not. The operator types in y if the answer is YES. Accordingly, the abnormal processing procedure further progresses so that the CPU 10 (#1) is released from the system and it restarts as a system with only the CPU 10 (#0), and the abnormal processing by the interruption is completed. After reconstruction is completed and the operating system restarted, a message that the CPU 10 (#1) is completely released is displayed as line 6. Then, a request for the operator to remedy the fault of the CPU 10 (#1) is displayed in line 7. The messages 1, 6 and 7 are transferred via the CCI interface 82 and the messages 2 to 5, via the DI interface 81.

The explanation which follows describes the maintenance command processing required to maintain the hardware of the CPU 10 (#1) released. The command processing is also one of the features of the invention. As described above, the reconstruction by the CPU 10 (#1) causes the operating control system to restart and the message is displayed on the screen of the CRT display device 50 of the operation console 20, the message being transferred through the CCI interface 82. However, it is permitted that the operation console 20 requests the maintenance command of the CPU 10 (#1) and is executed. The processing procedure is displayed on the CRT display screen. However, the data processing system with one CPU enables the interruption processing routine to be executed in the operation console by the abnormal interruption signal from the CPU and the CPU to be maintained from the operation console.

When the operator or a maintenance engineer desires to know the condition of the internal hardware in the CPU or to operate the CPU for maintenance purposes, he depresses the MAINT key as one of the functional keys on the keyboard 60 of the operation console 20 to instruct the operation processor 30 to operate as a maintenance processor. As seen from the flow chart in FIG. 7, the operations branching from step 220 will be carried out upon depression of the MAINT key. As previously stated referring to FIG. 6, after the depression of the "MAINT" key, the MAINT signal is produced after a wait time (one second) corresponding to one line message on the CRT screen transferred from the CPU 10 (#1) via the CCI interface 82. In the example, after the display of line ⑦ in FIG. 9, the MAINT key is depressed and if there is a message from the operating system continuing its operation only with the CPU 10 (#1) during one second, the message is displayed as line ⑧. When the MAINT signal appears, the operation advances to the maintenance common routine 222 through the processor interface 221, as shown in FIG. 7. The size of the programs implementing the maintenance processor is quite large but these programs are used less frequently. The response speed of the program for a human may be of such a degree as to be enough to follow the recognition speed of a human. Therefore, most of the program is stored in the flexible disk 40. Similarly, the maintenance command processing routines 223 are stored in the flexible disk 40. The maintenance processor interface 221, however, permanently stays in the memory 302. The processor 30 having been transferred from the operation processor to the maintenance processor in operation, first carries out the following two operations:

(1) To display the label of the flexible disk 40 having stored the maintenance processor to ask the operator to check whether a correct memory medium is used or not.
(2) To investigate the bit 0 in the RDS of two CPUs 10 connected to the corresponding DIPs 308. The bit 0 indicates the stoppage state of the CPU and, in the example, that of the CPU 10 (#1). The CPU stores the number of the DIP in a stoppage condition, and sets it up as an object to be processed by the maintenance processor 30. If the DIP connected is only one and its associated CPU is not in a stoppage state, the CPU is rendered to stop and used as an object to be processed by the maintenance processor. If two or more CPUs are in a stoppage state, it asks the operator or maintenance engineer which to choose as an object to be processed and operates under the instruction by him.

Returning again to the example shown in FIG. 9, after the display of line ⑨, if no new CCI service request is presented, the operation processor 30 reads out the maintenance processor program from the flexible disk and displays the label of the memory medium in line ⑨.

Upon completion of such preparation work, the maintenance processor common routine 222 shown in FIG. 8 requests the operator or the maintenance engineer to input the maintenance processor command and outputs a message of <MAINT>* onto the CRT screen while at the same time releases the lock of the keyboard. In response to the display of the message, the operator or engineer keys in the maintenance command from the keyboard 60. Some examples of the maintenance commands will be shown in Table 4.

TABLE 4

| Command Input Request | Kind of Command | Contents of Command |
|---|---|---|
| <MAINT>* | read | Read-out of register or memory |
| " | writ | Write of register or memory |
| " | exec | Initiation of CPU execution |
| " | step | Execution of one instruction or one microinstruction |
| " | cont | System reconstruction |
| " | load | Loading of control memory/memory exclusively used for operation check test |
| " | a stp | Address stop |
| " | f stp | Fault (exceptional condition) stop |
| " | inlz | Initializing |
| " | trans | Translate |
| " | macro | Macro definition |
| " | X | Macro execution |
| " | diag | Initiation of fault diagnostic program |
| " | bye | Completion of maintenance processor operation |

The maintenance commands shown in Table 4 frequently are more minutely specified by a subcommand. For example, in the case of the read command, the subcommand specifies a register, a main memory, or a control memory and then the name or address of the register as an object to be processed is inputted. A symbol (/) is placed between the command, the subcommand and the register name. An abbreviation of the first letter may be used for representing the command and subcommand. The maintenance processor common routine 222 shown in FIG. 7 checks the maintenance command keyed in from the keyboard 60 and reads out the corresponding maintenance command processing routine from the flexible disk 40 for execution. After the execution of the maintenance command given is completed, it is checked whether a new data input comes from the CCI interface 82. When new data is presented, it operates to complete the CCI service after step 201. When the CCI data service request disappears, the output of the MAINT flip-flop 90 shown in FIG. 6 causes the operation immediately to reenter the maintenance processor common routine 222 through the maintenance processor interface 221 in FIG. 7. In this case, since the maintenance processor has already been loaded, it is unnecessary to check the label of the flexible disk or to select the port to be processed and thus "<MAINT>*" of the message is immediately outputted. The locking of the keyboard 60 is similarly released and it waits for a subsequently incoming maintenance command (see Table 4). Following this, the processing of the operation processor will be continued in a manner that the CCI service is acceptable once one maintenance command is processed.

Continuing further with the description of FIG. 9, after the label display of line ⑨, "<MAINT>*" requesting the inputting of the maintenance command is displayed as line ⑩. On the other hand, it shows that the maintenance engineer inputs "r/r/ra" from the keyboard. The command, the subcommand, and the register name indicate "read/reg/ra". This is a maintenance command that reads out the contents of the "ra" register storing the address of it. Line ⑪ indicates the answer of the maintenance processor to the maintenance command and states that the contents of the "RA" register specified in the CPU 10 is "013572460123" (octal), for example. During the operation of the maintenance processor, when the operating system of the CPU 10 (#0) provides new data, i.e. a message similar to that shown in line ①, through the CCI interface 82, the message of line ⑫ is displayed at the time that the execution of the command of the maintenance processor 30 is completed. When the CCI service is completely ended, "<MAINT>*" requiring the succeeding maintenance command is displayed as line ⑬. Then, the operator keys in "diag" (Table 4) of the maintenance command from the keyboard. The maintenance command calls the diagnostic program and transfers control to the latter. As a result, the operation processor 30 having operated as the maintenance processor initiates its operation as the diagnostic processor. In the FIG. 9 example, the diagnostic program is so large as to need a plurality of flexible disks. The flexible disks storing the diagnostic program are separately prepared from those which store the maintenance processor and the like. The maintenance processor gives to the "diag" command a request of a message for flexible disk change. The message is displayed as line ⑭. Upon loading of a proper flexible disk, it calls the diagnostic processor (diagnostic monitor) and transfers control to the latter. When use of the maintenance processor is completed, the operator keys in the maintenance command "bye". The maintenance command processing routine for the "bye" so serves as to reset the MAINT flip-flop 90 shown in FIG. 6. As a result, control to the maintenance processor interface 221 in FIG. 7 is ineffective so that the processing ability of the operation processor is fully directed again to the processing of CCI service in the routine 201.

As seen from the foregoing, control of an entire operation processor may be performed readily and a single console may be used for two purposes; providing both CCI service and maintenance processor service. As previously described, the message on the CRT screen and the answer by a human to it are distinctly distinguished by a line unit on the CRT screen. Additionally, although a single screen is used for two purposes, the display is easy to see for a human. For example, if a service request of the CCI requesting a key-in input and the state of the maintenance processor concurrently take place, for example, only one of the two requests is permitted. With respect to the message coming from the operating system, the operator is accustomed to it. With respect to those from the maintenance processor, all the maintenance commands are headed by a standardized symbol of <MAINT>. Therefore, both the kinds of messages are clearly distinctive. Additionally, after a human properly responds to a key-in request, another key-in request message is displayed.

Similar processing may be attained if a typewriter is used in place of the combination of the CRT display device and the keyboard. A printer may be used in addition to the keyboard and the CRT display device. The shift to the maintenance processor mode is also possible by using a command inputted as a part of the CCI service in place of the "MAINT" key. The provision of the "MAINT" key enables the operator or the maintenance engineer to specify the shift from a normal operation mode to a concurrent mode permitting concurrent processing of the maintenance command and the normal operation. In a system in which, when an abnormality is detected, interruption is made for the operation processor, instruction is indirectly given to the operation console via the channel device in a normal condition; however, the direct coupling of it provides no problems in operation.

Figure 10:
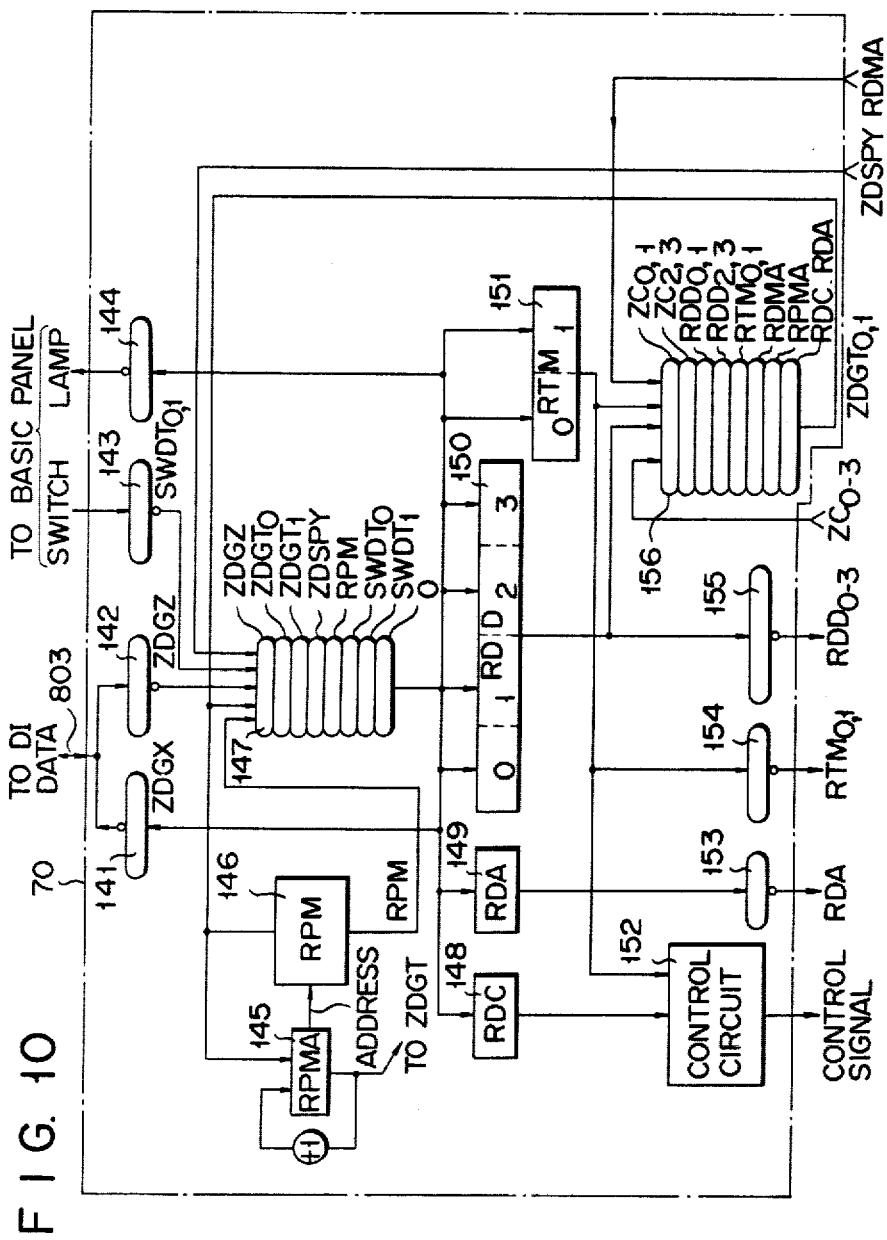
FIG. 10 is a block diagram illustrating the details of the diagnostic unit of FIG. 5.

Turning now to FIG. 10, there is shown in block form the construction of the diagnostic unit embodying the present invention referred to in FIG. 5. The diagnostic unit is designated by 70 in FIG. 1. The data line 803 of the DI interface 80 shown FIG. 2 is connected to a driver 141 and a receiver 142. Other signal lines in the DI interface are not illustrated. The output ZDGZ of the receiver 142 is connected via a selector 147 to a command register RDC 148, an address register RDA 149, and a data register RDD 150. These registers receive the corresponding segments of the diagnostic command, respectively. The output ZDGX of the selector 147 serves as an input of the driver 141 and as data sent out onto the data line 803 of the DI interface under control of a control circuit 152. The circuit just mentioned is basically used for receiving the diagnostic command transferred from the operation processor 30.

A circuit to execute the diagnostic command will be described with reference to FIG. 10. The output of the command register 148 is transferred to the control circuit 152. The control circuit 152 provides control signals corresponding to the diagnostic commands to the diagnostic unit in FIG. 1 and the CPU in FIG. 7. The outputs of the address register RDA 149 and the data register RDD 150 are transferred to the CPU in FIG. 7, through inverters 153 and 155. Subscripts attached to the signal names such as RDD 150 represent byte number.

In the circuit for executing the diagnostic command of data reading type, a data line ZC in the CPU is connected to the selector 156 and a diagnostic bus ZDSPY in the CPU is connected to the selector 147. The output ZDGT of the selector 157 is similarly connected to the selector 147. The output of the selector 147 is so coupled as to be sent out onto the data line 803 of the DI interface so that the data from the data line ZC connected to the CPU and from the diagnostic bus ZDSPY are so coupled to be sent out onto the data line 803 of the DI interface.

The above is the description of the circuit to execute the diagnostic command transferred from the operation processor. The remaining portion of the circuit in FIG. 10 will be described later. The description to be given below is how the diagnostic unit 70 is connected to the respective portions of the CPU 10.

Figure 11:
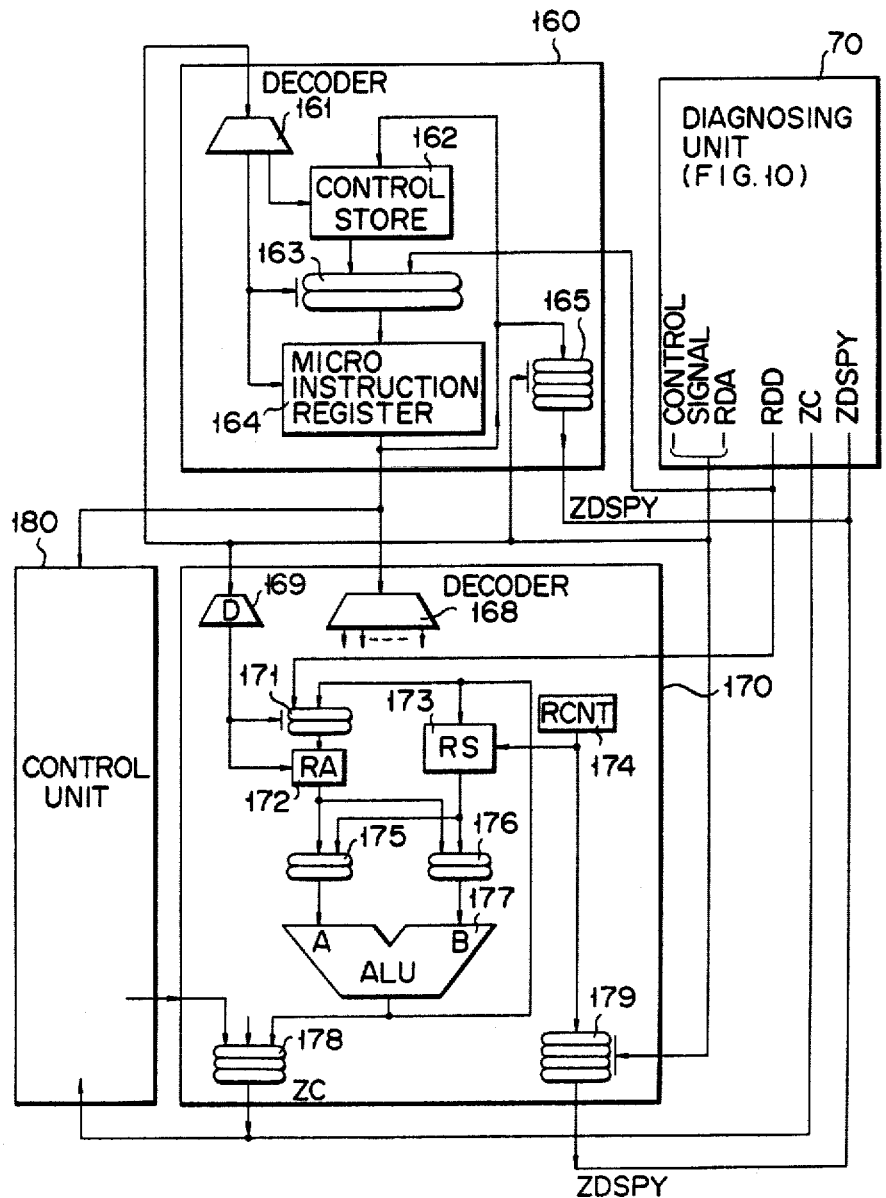
FIG. 11 is a block diagram of an improved hardware configuration for the CPU.

FIG. 11 shows a connection diagram of the CPU when the invention is applied to the CPU 10 of the microprogram type. The purpose of the diagram is to illustrate how the diagnostic unit 70 is connected to the respective parts in the CPU. Therefore, necessary portions in the CPU will be illustrated. Since the CPU shown in FIG. 11 is of the microprogram type, a control memory 162 for storing a microprogram is provided in a control memory unit 160. The output of the control memory 162 is applied to a microinstruction register 164, through a selector 163. The output signals from the microinstruction register 164 control the respective parts in the CPU. In the circuit for this control, only the microinstruction decoder 168 in an operation unit 170 is illustrated with omission of control signal paths. The microinstruction controls all other circuits than a decoder 169 and selectors 171 and 179 in the operation unit 170 of FIG. 11. The operation unit 170 includes a register 172 and a scratch pad memory 173 both of which are connected to selectors 175 and 176, respectively. The outputs of the selectors 175 and 176 are connected to two inputs A and B of an arithmetic logic unit ALU 177, respectively. The output of the ALU 177 is connected to a control unit 180, via a selector 178. The control unit 180 may write the result of a calculation into a main memory by using data from the ALU 177. The output of the ALU 177 serves as an input of the RA register 172 by way of the selector 171 and as an input of the scratch pad memory 173. Therefore, the calculation result of the ALU 177 may be again loaded into the RA register 172 and the scratch pad memory 173. The address of the scratch pad memory 173 is fed from a counter RCNT 174. The input signal of the RCNT 174 and the like are not illustrated. The output of the register RDD 150 in FIG. 10 for storing the diagnostic command is coupled with the selector 163 so that the data field of the diagnostic command (FIG. 4) may be loaded into the microinstruction register 164. The output of the RDD 150 is connected to the selector 171 and to other registers (not shown) permitting loading thereinto by the diagnostic command. The output control signal of the control circuit 152 in the diagnostic unit 70 in FIG. 10 and the address register RDA 149 provide the outputs to the decoder and the diagnostic bus in the respective parts of the CPU. In those circuit components, the decoders 161 and 169 and the selectors 165 and 179 alone are illustrated in FIG. 11. One of the outputs of the decoder 161 is so connected as to control the selector 163 and the microinstruction register 164. When the diagnostic command to instruct a writing into the microinstruction register 164 is given to the decoder 161, it is controlled so that the contents of the RDD 150 in FIG. 10 is loaded into the microinstruction register 164 through the selector 163. In the figure, is illustrated a control line operative in response to the diagnostic command of "write the contents of the microinstruction register into the control memory" in the terms of another output of the decoder 161 connected to the control memory 162. The latter command is used when the firmware is loaded.

The following describes the circuit for executing the diagnostic command of "read the contents of the register specified". The output of the microinstruction register 164 is coupled with the selector 165. The output of the selector 165 is connected to the diagnostic bus ZDSPY. To the bus ZDSPY are commonly connected the output of the selector 179 and the output of the selector (not shown). When the diagnostic command of "read the first byte of the microinstruction register 164", the control signal transferred from FIG. 11 and the RDA cooperate to select the corresponding input of the selector 165 and the one byte contents of the microinstruction register 164 appears on the diagnostic bus ZDSPY. This is sent out onto the data line 803 of the DI interface through the selector 147 in FIG. 6, as described above. The fault diagnosis is easily made if the circuit is so constructed that the contents of any register in the CPU is directly read from the diagnostic unit 70 by way of the diagnostic bus ZDSPY. Such a scheme, however, needs a large diagnostic bus ZDSPY, resulting in expensiveness. Therefore, the register or the memory which can produce an output signal onto the data line ZC under the control of the microinstruction, is connected so as to be read from the diagnostic unit via the ZC, without the diagnostic bus for such a register or a memory as an economical measure. The method to realize this will be given below. For example, in order to read the contents of the register RA, the first step is to load into the microinstruction register 164 a microinstruction of "The selector 75 selects the RA register 172 as an input; the ALU 177 outputs an A input as it is; the selector 178 selects the ALU 177 as in input". Then, a diagnostic command for reading the data line ZC is issued. Writing data into the address of the scratch pad memory 173 specified by the RCNT 174 takes the following procedure. First, the data to be written into the scratch pad memory 173 is loaded into the register RA 172 permitting a direct write by the diagnostic command. That is, the diagnostic command is performed in the following. In response to the diagnostic command, the output of the decoder 169 is "1" so that the RDD 150 in FIG. 10 is selected as an input of the selector 171. A clock pulse is applied to the register RA 172. Second, it is to execute a diagnostic command that the selector 175 selects the RA register 172 as an input for the microinstruction register 164, the ALU 177 outputs the A input as it is, and the output of the ALU 177 is written into the scratch pad memory 173. Then, the microinstruction is written into the microinstruction register 164. Third, it is to execute a diagnostic command to progress the CPU by one step.

When a human takes the initiative in control, the just-mentioned method is undesirable, having such the steps of procedure and a need of memorizing proper microinstructions. The following scheme solves such problem and enables a human to freely perform a read/write from and to the register in the CPU. This an important feature of the invention.

Returning again to FIG. 1, the operation processor 30 which is a system of a microprocessor application is provided with the flexible disk 40. The flexible disk 40 stores the procedure for reading and writing the registers as mentioned above and necessary microinstructions for all registers. The following program is prepared and stored in the flexible disk 40, together with the procedure and the microinstructions mentioned supra. The program to be prepared is: when an operator keys in the name of the desired register in terms of a symbolic name, the corresponding procedure and microinstruction are read out from the flexible disk 40; these read out are transferred as the diagnostic command to the diagnostic unit 70 by way of the DI interface; the result of it is displayed on the CRT device 50 of the console 20. Then, the operator loads the program from the flexible disk 40 to the operation processor 30, as demanded by the situation. Following this, the operator inputs the symbolic name of the desired register from the keyboard 60. For example, the above-mentioned two examples, reading and writing operations for the register RA 172, may be effected merely by the following keying operation.

R/RA

W/RS/012345006789

In the above, the first letters R and W represent abbreviations of READ and WRITE and "012345006789" is an octal number representing the contents to be written into the register RS 172. A response by the system to the R/RA is

RA=013572460123

This is the contents of the register RA 172 expressed in terms of the octal number and is displayed on the CRT display (see FIG. 9). In this manner, the cost related is reduced and the operation of the system is remarkably improved, compared to that of the conventional maintenance panel including switches and lamps. An example of the operations was illustrated in FIG. 9. The merits resulting from use of the diagnostic command to read the data sent out onto the data line under control of the microinstruction are: the number of the circuits for data transfer is reduced; the address field of the diagnostic command for specifying the register may be small, and therefore the hardware such as address decoder may be reduced. In the microprogram type CPU, the interior circuit may be freely controlled by using the microinstructions. Accordingly, it is designed so that the microinstruction register 164 and one of data registers (in the example, the register RA 172) permit a direct loading from the diagnostic unit 70. In such a construction, if the microinstructions are given through a proper procedure as mentioned above, loading may be freely made for several tens of registers in the CPU.

The explanation to follow is the operation when the diagnostic command is received by the diagnostic unit 70 through the DI interface data line 803 and is executed. Reference is made to FIGS. 10 and 12 in the explanation. A case to be first described is that the diagnostic command instructs the system to set the four byte data into the microinstruction register 164.

When the first one byte of the diagnostic command, i.e. the OP field comes from the DI interface data line 803, it is entered into the control circuit 152, through the receiver 142, the selector 147 and the command register 148 in the diagnostic unit 70 in FIG. 10. Upon receipt of the first one byte, the control circuit 152 acknowledges it that the head bit of the OP field is "1" and the end two bits are "0" and that it is a writing type command. Succeedingly, the control circuit 152 receives 5 bytes through the DI interface 80 and successively inputs them into the RDA 149 and the RDD 150 ($RDD_0$, $RDD_1$, $RDD_2$ and $RDD_3$). As a result, the contents of the RDA 149 and the RDD 150 are sent to the respective parts of the CPU, through inverters 153 and 155, as shown in FIG. 11. Then, the control circuit 152 transfers the control signal to the decoder 161 (FIG. 11). The decoder 161 provides the control signal, the selector 163 selects the RDD as input, and the output of the selector 163 is loaded into the microinstruction register 164. Through this operation, the four bytes data coming from the DI interface has been loaded into the microinstruction register 164. At this stage, the diagnostic command execution has been completed and the control ciruict 152 of the diagnostic unit 70 returns to be in waiting state.

A case to be second described is that the operational processor provides a diagnostic command to read out the contents of the RCNT 174 as a one-byte data. When the first one byte i.e. the OP field, of the diagnostic command comes from the data line 803 of the DI interface, the first one byte is entered into the control circuit 152 in a waiting state, by way of the receiver 142, the selector 147, and the command register 148. Upon receipt of the first one byte, the control circuit 152 knows that the first bit of the OP field is "1" and that the command is of data reading type. As in the case of the above-mentioned OP field, it receives another one byte from the data line 803 of the DI interface and then loads the byte into the RDA register. Then, the operation of it shifts to a data reading operation. Since the contents of the RDA register 149 indicates the selector 179, only the selector 179 of the selectors constituting the diagnostic bus ZDSPY, operates. Other selectors, for example, the selector 165, are all at a high impedance so as not affect the data on the diagnostic bus ZDSPY. The selector 179 selects the RCNT 174 as an input and outputs its contents to the diagnostic bus ZDSPY. While selecting the diagnostic bus ZDSPY as in the above, the control circuit 152 controls the selector 147 in FIG. 10 to select a constant 0 as input data and write the constant 0 into 0, 1 and 2 bytes of the RDD register 150. The control circuit 152 selects the ZDSPY of the selector 147 to drive the driver 141 and then transfers the value of the ZDSPY, i.e. the contents of the RCNT 174 previously outputted on the diagnostic bus ZDSPY, the data line 803 of the DI interface. Transferring data to the DI interface, the control circuit 152 writes the data into the third byte of the RDD register 150. The reason why the data read by the diagnostic command is transferred to the operation processor while at the same time loaded into the RDD register 150, will be referred to later. The description thus far made relates to the case where the end two bits of the OP field of the diagnostic command of reading type is "3", i.e. the case of the diagnostic command for reading out the one byte data. However, when the end two bits in the OP field is "n", i.e. (4-n) byte data is transferred to the operation processor, the data is loaded into the n to third bytes of the RDD register 150 and "0" is loaded into the rest bytes of the same register.

The operation when data is read out from the data line ZC will be described by using the case of reading from the register RA 172. In this case, as previously stated, the operation processor 30 takes two steps of procedure: the first step is to load the microinstruction corresponding to the end to the microinstruction register 164; the second step is to read out the data from the data line ZC. Then, it sends the diagnostic command to the CPU. The first step operation (loading into the microinstruction register 164) has been described previously. The explanation will be started from the stage where the microinstruction to send out the contents of the RA register 172 onto the data line ZC has been loaded into the microinstruction register 164. The microinstruction is decoded by the decoder 168 to energize some control lines (not shown). As a result, the selector 175 selects the register RA as an input and the ALU 177 outputs the A input, i.e. the output of the selector 175, as its output, the selector 178 selects the ALU 177 as an input. That is, control is made in such a way. The result is that the contents of the RA register 172 is outputted as th output from the selector 178 to the data line ZC. Assume now that the operation processor 30 enters the second step, shifts to the stage where it produces a diagnostic command for reading the data line ZC, and shifts to the operation to read the 4 byte data of the ZC. The transfer operations of the command portion and the address portion are similar to that of the other command case and thus the description thereof will be omitted. The explanation will be made of the data transfer operation. The control circuit 152 sees the address portion stored in the RDA register 149 (the connection from the RDA 149 to the control circuit 152 is not illustrated) and knows it is the diagnostic command to read the data line ZC. Then, the control circuit so controls the selector 156 as to select $ZC_{0,1}$ while at the same time controls the selector 147 to select the $ZDGT_0$. Th 0 byte in the contents of the RA register 172 previously outputted onto the data line ZC is applied to the RDD register 150 and the driver 141 through the selector 147. It passes through the driver 147 to reach the data line 803 of the DI interface as the first byte of the data and also to enter the 0 byte of the RDD register 150.

Then, the control circuit 152 controls so as to select the $ZDGT_1$ of the selector 147, and transfers the first byte of the contents of the RA register 172, through the data line ZC, the selector 56 and the selector 147, while at the same time loads it into the first byte of the RDD register 150. Then, in a similar procedure, it controls the selector 156 to select the data line $ZC_{2,3}$, the selector 147 to select the $ZDGT_0$, and the same selector 147 so as to select the second byte of the RA register 172 and then the $ZDGT_1$. Then, it transfers the third byte of the contents of the RA register 172 successively to the DI interface 80. At the same time, the same data is loaded into the second byte and then the third byte of the RDD byte register 150. In this manner, the contents of any register is taken onto the data line ZC by using the microinstruction and then the diagnostic command to read the data on the data line ZC is issued. Through this operation, the contents of any register may be read out from the operation processor. It is to be noted here that, although only two portions (the microinstruction register 164 and the data line ZC) of the CPU are directly accessed by two kinds of diagnostic commands, the contents of several tens registers in the CPU may be read out by using proper microinstructions and a proper procedure, as mentioned above.

An explanation to be given is the operation when data is written into the address of the scratch pad memory 173 specified by the RCNT 174.

As described above, the operation progresses in the following manner:.

step 3. The control circuit 152 recognizes the diagnostic command has no data field from the fact that the head bit in the diagnostic command field is zero. As reception of the address portion is completed, the operation shifts to execution of the command. In this phase of operation, the control circuit 152 sends an execution start signal and an execution stop signal to the main control unit (not shown) of the CPU 10. Upon receipt of this, the main control unit produces a clock signal by one step and halts, so that the microinstruction given at the second step is executed. As a result, desired data are written into the scratch pad memory 173.

Having described the case where data are written into the address of the scratch pad memory 173 specified by the RCNT 174, in order to write data into any address of the scratch pad memory 173, before the first step execution, a desired address is written into the RCNT 174 in a similar manner, with respect to the first to third steps. In the writing operation into the RCNT 174, it is so controlled that the DATA in the RA register 172 is written into the RCNT 174.

A typical example of the diagnostic commands has been described in detail with the operation thereof. In the example, diagnostic commands as shown in Table 5 are used. The explanation to follow is the details of the respective commands in Table 5. Incidentally, the commands in Table 5 are the details of those in Table 1.

TABLE 5

| | | Diagnostic Commands | | | | | |
|---|---|---|---|---|---|---|---|
| | | Command Field | | | | | |
| Kind of Commands | Subcommands | 1 to 3 | 4 to 5 | 6 | 7 to 8 | Address Field | Data Field |
| CPU Start | — | 0 | | ← | ← | Address of Control Memory → | None |
| CPU Step | — | 1 | | ← | ← | Same as above → | None |
| CPU Test | Stop Test | 2 | 0 | | | | |
| | Branch in Test | 2 | 2 | ← | ← | Address of RPM → | None |
| | Start Test | 2 | 3 | ← | ← | Address of RPM → | |
| Microinstruction Read-out | | 3 | | ← | ← | Address of Control Memory → | None |
| Data Read-out | Ordinary Data Read-out | 4 | 0 | | SEP | Address of Information Source | Present |
| | Register File Read-out | 4 | 2 | | SEP | Address of File ←—→ | Address in File ←—→ |
| Data Write-in | Ordinary Data Write-in | 5 | 0 | | SEP | Address of Register | Present |
| | RDD Write-in | 5 | 2 | | — | Address of Register | RDD |
| Main Memory Read-out | — | 6 | — | | SEP | Part of Main Memory Address | Present |
| Main Memory Write-in | — | 7 | — | | SEP | Part of Main Memory Address | Present |

Step 1: Data is loaded into a register permitting a direct loading thereinto by a diagnostic command. In the example, the register is the one 172.

Step 2: The microinstruction instructing "write the contents of the RA register 172 into the scratch pad memory 173", is loaded into the microinstruction register 164.

Step 3: The CPU 10 is advanced by one step.

It will be understood from the foregoing description how the diagnostic commands are executed which are issued from the operation processor 30, in order to execute the first and second steps. Therefore, the description to now be given with reference to FIG. 10 is only the operation after reception of the address field in the command field of the diagnostic command in the The "start CPU command" is much the same as the diagnostic command of "Advance CPU by one step" as previously mentioned as a typical example and only the difference therebetween resides in that the control circuit 152 transfers only the execution start signal to the main control circuit. Accordingly, when the start CPU command is issued, the CPU starts its operation.

The "Step CPU Command" is the diagnostic command of "Advance CPU by one step" itself. The command is also used to halt an operating CPU. The main control circuit of the CPU in the example is so designed that the execution start signal during the CPU operation is ignored. Accordingly, such a use of the command is permissible. The details of the operations of two commands of start CPU and step CPU also depend on the test mode register RTM (151 in FIG. 10). The RTM register 151 determines an ordinary test mode and may specify an address step mode or a single step mode. The RTM register 151 serves to specify the restriction of such an operation as to be performed during the execution of the start CPU command and the step CPU diagnostic command, to the effect "Load the microinstruction stored in the specified address of the control memory 162 into the microinstruction register 164". The example described referred to FIGS. 10 and 11 was the case where this restriction function is effective. When the restriction function is ineffective, the microinstruction is read out from the address of the control memory 162 specified by the bits 4 to 8 in the command field and the address field of the diagnostic command and then is loaded into the microinstruction register 164. Following this, the execution start signal (the execution stop signal in the case of the step CPU command) is applied to the main control circuit.

The "test CPU command" will be given later.

The "microinstruction read-out command" is the same as the start CPU command except that the execution start signal is not transferred to the main control circuit. The command is used to read out the microinstruction from the control memory 162 and load it into the microinstruction register 164.

The "data read-out command" is divided into "ordinary data read-out command" and "register file read-out command", depending on the bits 4 to 5 bits in the command field. What is described in the operation by using the typical example, is "normal data read-out command". The address field is used to specify the register, the diagnostic bus ZDSPY, the data line ZC and the like. The register specified, or addressed, by the command is only the registers (including the memorys) directly connected to the selector 147 or the selector 156 shown in FIG. 10. Such registers are RPM 146, RDD 150, RTM 151, RPMA 145 and RDMA (the data line is illustrated). Most of the registers in the CPU (for example, the RA register 172) are read out mainly through the data line ZC so that these are not specified by the diagnostic command. Dispensing with the specifying by the diagnostic command leads to cost reduction and thus meeting with one of the objects of the invention. This is as mentioned above. The SBP in Table 5 has been previously stated relating to FIG. 4.

The "register file read-out command" enables one to access to the register file (not shown) in the CPU, thus enhancing a reading operation. The register file read-out command operates such that after the microinstruction is loaded into the microinstruction register 164, the diagnostic unit 70 reads out its output through the data line ZC. This command is essentially equal to the "ordinary data write-in command".

The "ordinary data write-in command" has been mentioned as the typical example. The command may specify not only the register but also the memory (for example, the RMP 146 in FIG. 10 or the control memory 162 in FIG. 10).

The "RDD write-in command" uses the contents of the RDD register 150 as the command data, unlike the "ordinary data write-in command" and does not transfer the data field through the data line 803 of the DI interface. This command is used to load the data read out by the "data read-out command" into the register (including the memory). It is for this reason that, when the "data read-out diagnostic command" is executed, the data is sent out onto the data line 803 of the DI interface, and at this time the data is simultaneously loaded into the RDD register 150.

The difference of the "main memory read-out command" from the "data read-out command" is that, after it issues a read-out instruction as well as an address to the main memory 140, the data transfer is not started until the main memory operation is ended. The diagnostic unit 70 reads data through the data line ZC. A part of the main memory address is given from the address field while the rest of it, by the address register RDMA (not shown). Before execution of the "main memory read-out command," the address information necessary for the RDMA register is written. In execution of the "main memory command", the RDMA register operates in count-up mode and thus it is useful for a continuous reading of the address.

The difference of the "main memory write-in command" from the "data write-in command" is that, with respect to the data received, the address or write-in instruction are transferred to the main memory.

The commands mentioned above are used to instruct a basic operation commonly used for fault diagnosis, maintenance, firmware loading, fault detection, etc.

The description will now be given how the diagnostic commands are used for the various objects.

A micro-diagnostic method has been established for fault diagnosis. It will be readily understood that any microinstruction is given and executed (by using a "step CPU command"), and the result of the execution is read for diagnosis. Instruction is possible from the operation processor 30 by using the diagnostic commands. The diagnostic procedure may be executed by the operation microprocessor 30 which is an application of the microprocessor. Therefore, it is apparent that only those diagnostic commands are satisfactory for the fault diagnosis. As described above, the maintenance operation may effectively be performed by sending the diagnostic command through the operation processor. The fault diagnosis by the operation processor has been described referring to FIGS. 6 to 8.

It is apparent that the firmware loading may be performed by using "data write-in diagnostic command" directed to the microinstruction register 164, the control memory 162 and the control memory address register (not shown).

The fault diagnosis may be conducted by using the diagnostic commands, as mentioned above. In the same way, fault detection is also possible. Incidentally the RPM 146 is used to store the fault detection procedure in the form of a diagnostic command train.

Having described a case where the operation processor 30 serves as the control master of the diagnostic unit 70, other systems may readily be used as the control master. The following description is such a case.

The circuit is so connected that the output of the RPM 146 is connected to the selector 147 in FIG. 10, the output of the selector 156 is connected to the input of the RPM 146, and the RPM 146 is addressed by the counter RPMA 145. Additionally, a count-up function is given to the RPMA 145. The output of the selector 156 is coupled with the input of the RPMA 145 and the output of the RPMA 145 to the input of the selector 156.

One flip-flop FRPM (not shown) is used in the control circuit 152. The control circuit 152 controls so that, when the FRPM is set, the selector 147 selects the RPM 146 instead of the ZDGZ. When the FRPM is set, waiting the data receiving from the data line 803 of the DI interface is not stopped but the RPMA 145 is counted up. Further, when the FRPM is set, the control circuit 152 is so modified to stop the drive of the driver 141 in order to transform the data to the DI interface 80.

The fault detection procedure of the CPU 10 is stored in the RPM 146 in the form of a train of diagnostic commands. The RPMA 145 is set at a given value (for example, 0). Then, the FRPM flip-flop is set by a suitable means. If so, the diagnostic command is read out from the RPM 146, it is executed as if it is fed from the operation processor 30. Immediately after the execution is completed, the succeeding command is read out from the RPM 146 and executed. In this manner, the fault detection procedure may be conducted in a short time.

The "test CPU command" in Table 5 is used to control the RPM 146 and its associated circuit. Execution of the "stop test command" in the test CPU commands causes the control circuit 152 to reset the flip-flop of FRPM. The command is used to stop the reading-out of the diagnostic command from the RPM 146 in the end of the diagnostic command train stored in the RPM 146.

The "branch in test command" controls so that, when the zero detector (not shown) of the CPU detects zero, nothing is made and the succeeding diagnostic command is read out. However, when it does not detect zero, it controls the selector 156 so as to select the respective registers RDC and RDA of 148 and 149 and controls so as to write the output of the selector 156 into the RPMA 145. Accordingly, the diagnostic command train may be branched in the RPM 146. The command aims mainly at the judgement whether a fault occurs or not, and is a conditional branch instruction in the diagnostic command in the RPM 146.

When the "start test command" is executed, the control circuit 152 writes the address of the RPM 146 given as mentioned above into the RPMA 145 and then sets the FRPM. Through this, the execution of the diagnostic command train stored in the RPM 146 has started. This command is used to instruct the execution start of the diagnostic command train in the RPM 146 and also as an unconditional jump of the diagnostic command in the diagnostic command train in the RPM 146.

The RPM 146 is used to store the fault detection procedure. It may also be effectively used in the following case. One of the such case is when maintenance must be made by using an oscilloscope. In this case, it is necessary to repetitively operate the CPU 10 at high speed in the same mode. However, this is easily realized when the diagnostic command to instruct the operation to the RPM 146 and a loop is formed by using the conditional jump command (start test command), and under this condition, the command is executed. Another case is when the fault diagnostic program is applied to the fault occurring intermittently, i.e. the intermittent fault. A part of the fault diagnostic program is stored in the RPM 146 and a similar loop is constructed. And the repetitive execution of the command is carried out at a high speed. This arrangement improves a possibility of the diagnosis of the intermittent fault. This also is applicable for such an occasion that a part of the fault diagnostic program is repetitively performed and an observation must be made by an oscilloscope.

The example is provided with a small panel (a basic panel) through which an operator operates the diagnostic unit when fault occurs in the DI interface or the operation processor. In FIG. 10, there is illustrated a connection between the diagnostic unit 70 and the basic panel. Basically, the basic panel is provided with a display device of one byte, a switch of two byte, and a push button for producing a signal corresponding to the SELECT signal of the DI interface. In this way, it is easy to additionally connect new control master unit to the diagnostic unit.

As seen from the foregoing, there is provided an inexpensive hardware system with improved versatility in use and which is adapted commonly for various objects, keeping good maintenance. Additionally, there is provided a method capable of easily and smoothly altering the state in the information processing unit by an instruction from an operator.

The useful and advantageous effects resulting from the invention are as follows:

(1) The operation processor stores a standard processing procedure for coping with an abnormal condition such as a CPU fault which is difficult in handling for the operation system. Therefore, it is unnecessary to take special training to execute the abnormality processing procedure.

(2) Elimination of the maintenance panel leads to lower system cost.

(3) The new diagnostic unit has many functions of the conventional maintenance panel function, fault diagnosis, firmware loading, and the like.

(4) The maintenance panel function may be performed by using a symbolic name and octal number (or hexadecimal notation) through the CRT and keyboard. Therefore, system operation is improved.

(5) Because of microprocessor control, if the micro of the maintenance command is defined as seen in Table 4 and it is performed, the repetitive operation or the like may be very easily carried out.

(6) The function inherent to the maintenance diagnostic hardware is segmented into some basic and common operations and these are used as independent diagnostic commands. If so, the respective diagnostic commands may be used commonly for various objects and uses.

(7) Since a normalized format is used for the diagnostic command, it easily controls the transfer and the interpretation of the diagnostic command and it has a variety of applications and it may be used commonly from any type of control master unit.

(8) The maintenance and diagnostic basic functions are controlled through an interface using definite diagnostic commands. The design of the control procedure at the control master side is simplified.

It will be apparent to those skilled in the art that various modifications and variations could be made to the embodiment of the invention as hereinabove described without departing from the spirit and scope of the invention.

What we claim is:

1. An information processing system comprising:
   an information processing unit including a main memory, a system controller connected to said main memory, and a CPU connected to said main memory through said system controller and having a fault diagnostic unit;
   an interface connected to said fault diagnostic unit of said information processing unit; and
   an operation console connected to said interface and including a microprocessor having a first operation mode for carrying out at least a normal operation processing procedure and a second operation mode for executing both a maintenance command processing procedure and a normal operation processing procedure, said microprocessor further having at least one microinstruction memory for storing a maintenance command processing routine for executing said maintenance command processing procedure and a function key for outputting a signal designating either said first operation mode or said second operation mode; and means for selecting one of said first or second operation modes in response to said designating signal of said function key.

2. An information processing system according to claim 1, wherein after execution of a maintenance command a normal data processing is carried on, and when no request for a normal data processing comes, the next maintenance command is executed.

3. An information processing system according to claim 1 further including:
a fault detection means coupled to said information processing unit for detecting the occurrence of a fault in said information processing unit; and
means for generating an interruption signal in response to the detection of a fault by said fault detection means and for transferring said interruption signal to said console through said interface.

4. An information processing system according to claim 3 further including:
a status register for storing fault data representing a fault detected by said fault detection means; and
means in said operation console responsive to said interruption signal for accessing said fault data stored in said status register and for determining the cause of said detected fault from said accessed fault data.

5. An information processing system according to claim 1 or 3 wherein said operation console further includes a microinstruction memory for storing an interruption processing routine and a flexible disk unit connected to said microinstruction memory for storing an abnormality processing routine and wherein said microprocessor executes said interruption processing routine in response to said interruption signal and accesses said abnormality processing routine stored on said flexible disk to determine the cause of said interruption signal.

6. An information processing system according to claim 1 wherein (1) said fault diagnostic unit includes means for detecting the occurrence of a fault in said information processing system and (2) said system control issues a repair command requesting the repair of a fault in response to the detection of said fault, and wherein said information processing system further includes:
a plurality of peripheral units;
a channel for connecting said peripheral units to said system controller;
an input-output interface for connecting said channel and said operation console; and
means for transferring to said operation console through said input-output interface said repair command issued by said system controller.

7. An information processing system according to claim 1 further including:
a flexible disk unit connected to said microinstruction memory for storing a maintenance processor common routine and a plurality of maintenance command processing routines singly associated with a plurality of maintenance commands; and
a keyboard for inputting a maintenance command, and wherein said microprocessor includes means responsive to the selection of said second operation mode for accessing said maintenance processor command routine and said maintenance command processing routine associated with said inputted command and for supplying said accessed routine to said microprocessor for execution thereby.

8. An information processing system according to claim 5 wherein (1) said flexible disk includes means for storing a maintenance processor common routine and a plurality of maintenance command processing routines singly associated with a plurality of maintenance commands; (2) wherein said system further includes a keyboard for inputting a maintenance command; and (3) said microprocessor includes means responsive to the selection of said second operation mode for accessing said maintenance processor common routine and said maintenance command processing routine associated with said inputted command and for supplying said accessed routines to said microprocessor for execution thereby.

9. An information processing system according to claim 7 or claim 8, wherein if the operation of said system switches from the first mode to the second mode, a normal data processing request is executed for a specific time period and wherein at the end of said time period a maintenance command processing routine is read from said flexible disk and is executed to control the processing by said microprocessor.

10. An information processing system according to claim 7 or claim 8, further comprising a timer connected to receive said designating signal from said mode selection means and for starting operation when the first mode is switched to the second mode by the operator, whereby a normal data processing request is executed for a specific period set in the timer and the second mode is then executed upon lapse of said specific time period.

11. An information processing system provided with an operation console for processing both normal operation processing commands and maintenance processing commands comprising:
a function key included in said operation console for selectively generating first and second output signals;
first and second information processing units connected to said operation console, each of said information processing units including a main memory, a system controller connected to said main memory, a CPU connected to said main memory through said system controller, and a fault diagnostic unit;
first and second interfaces for connecting said fault diagnostic unit of said first and second information processing units, respectively, to said operation console;
a microprocessor in said operation console having a first operation mode for executing at least said normal operation processing commands and a second operation mode for executing both said maintenance processing commands and said normal operation processing commands, said microprocessor further having at least one microinstruction memory for storing an interruption processing routine and a maintenance command processing routine for controlling the execution of said maintenance processing commands, and means for selecting said first operation mode in response to said first output signal and said second operation mode in response to said second output signal;

a flexible disk connected to said microprocessor for storing an abnormality processing routine;

means for transferring an interruption signal to said microprocessor of said operation console through said first and second interfaces upon the detection of a fault in at least one of said first and second information processing units by at least one of said fault diagnostic units included in said first and second information processing units, said interruption signal being transferred from said first information processing unit through said interruption signal transferring means to said microprocessor operating in said first operation mode, said microprocessor for first accessing and executing said interruption processing routine stored in said microinstruction memory and then for accessing and executing said abnormality processing routine read out of said flexible disk through said microinstruction memory;

means for switching said microprocessor from said first operation mode to said second operation mode after the execution of said abnormality processing routine is terminated; and means in said operation console for selecting said first information processing unit for the execution of said maintenance processing command and said second information processing unit for the execution of said normal operation processing commands.

* * * * *